(12) United States Patent
Baus

(10) Patent No.: US 9,033,609 B2
(45) Date of Patent: May 19, 2015

(54) LOCKING PIN WITH PROTECTIVE CAP

(75) Inventor: Roman Baus, Rubicon, WI (US)

(73) Assignee: A.I.L., Inc., North Platte, NE (US)

( * ) Notice: Subject to any disclaimer, the term of this patent is extended or adjusted under 35 U.S.C. 154(b) by 202 days.

(21) Appl. No.: 13/557,996

(22) Filed: Jul. 25, 2012

(65) Prior Publication Data

US 2014/0030011 A1    Jan. 30, 2014

(51) Int. Cl.
| F16B 5/06 | (2006.01) |
| F16B 7/10 | (2006.01) |
| F16B 21/16 | (2006.01) |
| F16B 21/14 | (2006.01) |

(52) U.S. Cl.
CPC ............... *F16B 7/105* (2013.01); *F16B 21/165* (2013.01); *F16B 2021/14* (2013.01)

(58) Field of Classification Search
CPC .......................... F16B 13/0891; F16B 5/0088
USPC ........ 403/322.2, 325, 408.1; 24/453; 411/348
See application file for complete search history.

(56) References Cited

U.S. PATENT DOCUMENTS

| 2,373,083 | A | * | 4/1945 | Brewster ........................ 411/348 |
| 2,968,205 | A | * | 1/1961 | Springate ...................... 411/348 |
| 2,983,978 | A | * | 5/1961 | Wilgus ........................... 411/348 |
| 3,101,641 | A | * | 8/1963 | Walker et al. ................. 411/348 |
| 3,117,484 | A | * | 1/1964 | Myers ............................ 411/348 |
| 5,061,112 | A | * | 10/1991 | Monford, Jr. .................. 403/328 |
| 6,752,562 | B2 | * | 6/2004 | Mills et al. .................. 403/322.1 |
| 6,762,938 | B2 | | 3/2005 | Baus |
| 2008/0056814 | A1 | * | 3/2008 | Klingenberg et al. ...... 403/322.2 |
| 2011/0008128 | A1 | * | 1/2011 | Soltis et al. .................... 411/348 |

OTHER PUBLICATIONS

"Clevis pin with Holes", Pivot Point Inc., Hustisford, WI, http://fastening-solutions.pivotpins.com/viewitems/cold-heading-solutions/clivis-pins-with . . . , at least as early as Dec. 2011.
"Slic Pins", Pivot Point Inc., Hustisford, WI, http://fastening-solutions.pivotpins.com/product/exclusive-fastener-innovations/slic-pins-- . . . , at least as early as Dec. 2011.
"Quick Release Solutions", Pivot Point Inc., Hustisford, WI, http://fastening-solutions.pivotpins.com/category,quick-release-solutions, at least as early as Dec. 2011.

* cited by examiner

*Primary Examiner* — Michael P Ferguson
(74) *Attorney, Agent, or Firm* — Greer, Burns & Crain, Ltd.

(57) ABSTRACT

A locking pin is provided for securing movable mechanical components, and includes a tubular body defining an axial passageway. The tubular body has an actuating end and a tapered working end opposite the actuating end, and has at least one latch opening proximate the working end. The pin has a spindle constructed and arranged for reciprocation in the passageway, as well as at least one locking element, each positioned within the passageway at a corresponding latch opening, and being urged toward the corresponding latch opening by the spindle. A cap is fastened to the working end for restricting entry of contaminants into the passageway.

11 Claims, 6 Drawing Sheets

LOCKING PIN WITH PROTECTIVE CAP

BACKGROUND

This invention relates to securing movable mechanical work-pieces, and more particularly, to locking pins used to retain adjustable machine components in designated locations.

It is known, for example in agricultural machinery, to employ towed implements, such as tillage devices, row cleaners, or the like that have adjustable work positions. The implement typically includes a main vehicle portion, and a working portion having a vertical bracket provided with at least one row of vertically spaced apertures. The bracket is adjustable relative to the vehicle portion using a vertical row of spaced openings on the vehicle portion that correspond to the openings on the vertical bracket. Relative adjustment of the height of the working portion to the vehicle portion is achieved by inserting a locking pin through corresponding openings on the working portion and vehicle portion.

Conventional locking pins often employ a cotter pin or locking ring to retain the pin in position in the bracket, especially when the machinery is used in extreme work environments subject to significant vibrations and/or torque forces. A disadvantage of the cotter pin mechanism is that the cotter pin requires extra operator effort to remove and replace when machine adjustment is desired. Also, cotter pins are easily lost in the field.

To address the problems of cottered locking pins, a more advanced locking pin has been developed, which employs self-contained locking elements, preferably ball bearings. The bearings are urged radially outward from a periphery of the pin to prevent the pin from being dislodged from the bracket. An example of such a pin is manufactured by Pivot Point of Hustisford, Wis. This pin employs a spindle reciprocating within a tubular body. The spindle holds the bearings in the extended, locking position, and actuation of the spindle by a user moves the spindle to a release position, allowing the balls to retract, and permitting pin extraction. One disadvantage of the latter pin is that when used in dusty conditions, in some cases dirt accumulates in the spindle passage, impeding spindle movement, and making the pin difficult to extract from the bracket. Similar problems have been encountered when using such pins on components of motocross motorcycles when conditions are muddy or dusty.

Consequently, there remains a need in the art for a locking pin that functions quickly, without the need for a cotter pin, and more reliably in extreme work environments.

SUMMARY

The above-listed needs are met or exceeded by the present locking pin. In the present pin, a cap is featured, which not only extends the body of the pin, but also provides a barrier to outside elements. Such extension of the tapered end of the body allows for quicker and more accurate location and insertion into a mechanical work-piece. The cap also restricts environmental contaminants from entering the body of the pin, facilitating unrestricted movement of the actuating elements within the pin.

More specifically, a locking pin is provided for securing movable mechanical components. Included on the pin is a tubular body defining an axial passageway, and having an actuating end and a tapered working end opposite the actuating end. At least one latch opening is provided proximate the working end. A spindle is constructed and arranged for reciprocation within the passageway, and at least one locking element is positioned within the passageway at a corresponding latch opening, each of which is urged toward the corresponding latch opening by the spindle. A cap is fastened to the working end for restricting entry of contaminants into the passageway.

In another embodiment, a cap is provided for use with a locking pin, wherein the locking pin has a tubular body, a passageway accommodating a reciprocating spindle, the passageway having a first counter-bore and housing a biasing element, and at least one locking element positioned within the passageway, where each locking element is urged into a corresponding latch opening upon release of the spindle. The cap includes a body having an open end positioned within a counter-bore in the tubular body, and defining a tubular chamber dimensioned for accommodating the reciprocation of the spindle. The cap body includes a closed end opposite the open end, forming a tapered annular shoulder that, upon assembly, extends a tapered working end of the locking pin, and facilitating location of the working end of the locking pin into a work-piece. The cap body is configured for engaging the working end of the tubular body with a friction fit for restricting entry of contaminants into the passageway.

DETAILED DESCRIPTION

Figure 1:
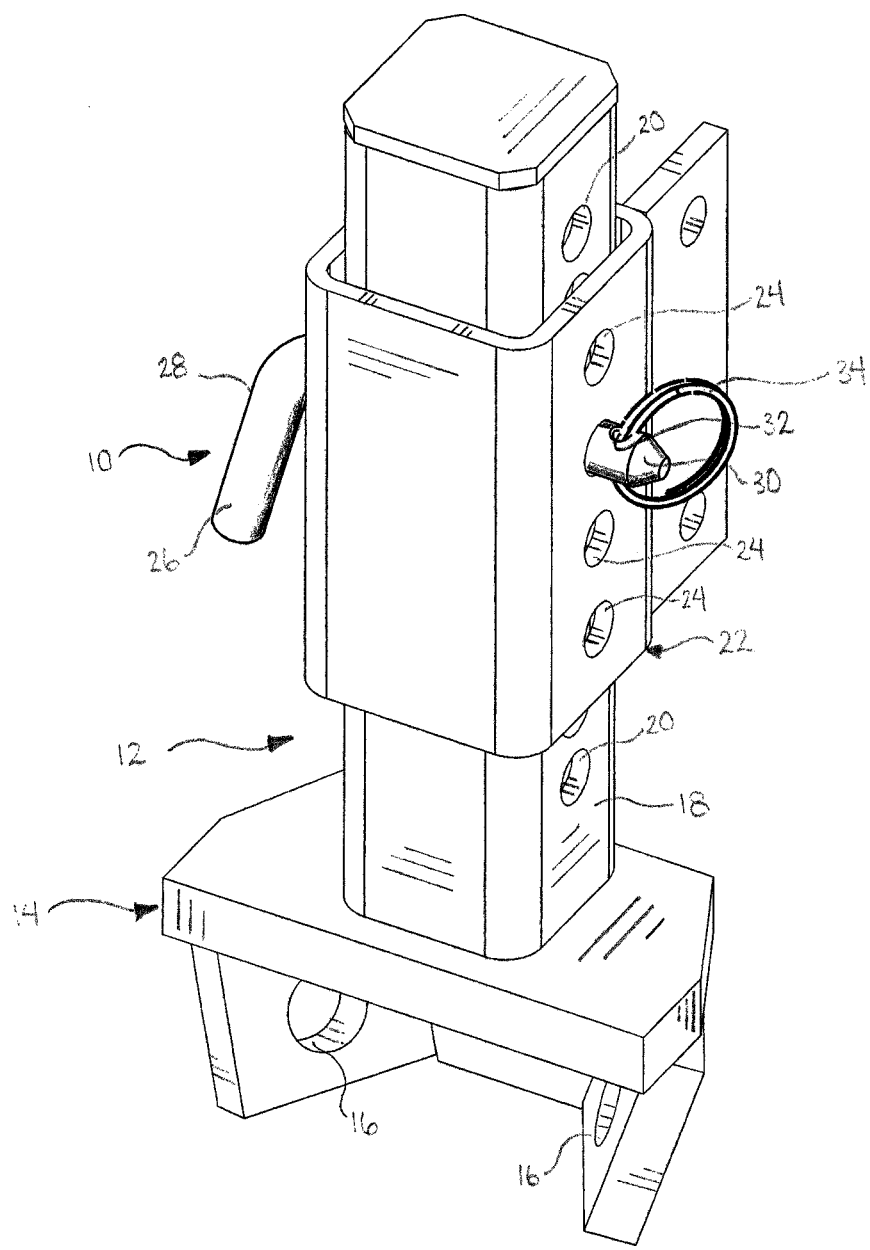
FIG. 1 is a top perspective view of an adjustable work-piece apparatus employing a prior art embodiment of a cottered locking pin.

Referring now to FIG. 1, a conventional locking pin employing a cotter pin locking system is indicated generally at 10. The locking pin 10 is shown mounted to a portion of an agricultural machine with adjustable work positions, indicated generally at 12. In the illustrated embodiment, the agricultural machine 12 includes a movable portion indicated generally at 14. The movable portion 14 includes agricultural implement mounting apertures 16, and a vertical bracket 18. To facilitate adjustable positioning, the vertical bracket 18 is provided with at least one row of vertically spaced apertures 20. A fixed, sleeve-like complementary portion to the vertical bracket 18, indicated generally at 22, also includes at least one row of vertically spaced apertures 24. This fixed portion 22 is typically mounted to a relatively fixed object, such as an implement vehicle portion, which has a relatively constant position during operation. The working environment of the present pin is not limited to the type of machinery described.

Adjustment of the height of the movable portion 14 relative to the fixed portion 22 is achieved by inserting the locking pin 10 through both the fixed portion and the movable portion 14 by aligning selected respective apertures, 24 and 20. The locking pin 10 embodied in FIG. 1 includes a solid rigid body 26, having a relatively angled handle end 28 and a tapered locking end 30. To prevent the locking pin 10 from becoming dislodged during operation, the locking end 30 includes a bore hole 32 for facilitating the insertion of a cotter pin or ring 34. Once the locking end 30 of the locking pin 10 is inserted through the aligned apertures, 24 and 20, and the cotter pin 34 has been installed, the locking pin 10 maintains the position of the movable portion 14 within the machine 12.

To change the relative position of the movable and fixed portions, 14, 22, the cotter pin 34 is first detached from the locking pin 10, then the locking pin is removed from apertures 20, 24 in the machine 12. Unless it is somehow tethered to the machine 12, the cotter pin 34 is easily lost or misplaced in the field. Additionally, this locking pin 10 cannot be removed one-handed by the user. Thus, this arrangement has several disadvantages.

Figure 2:
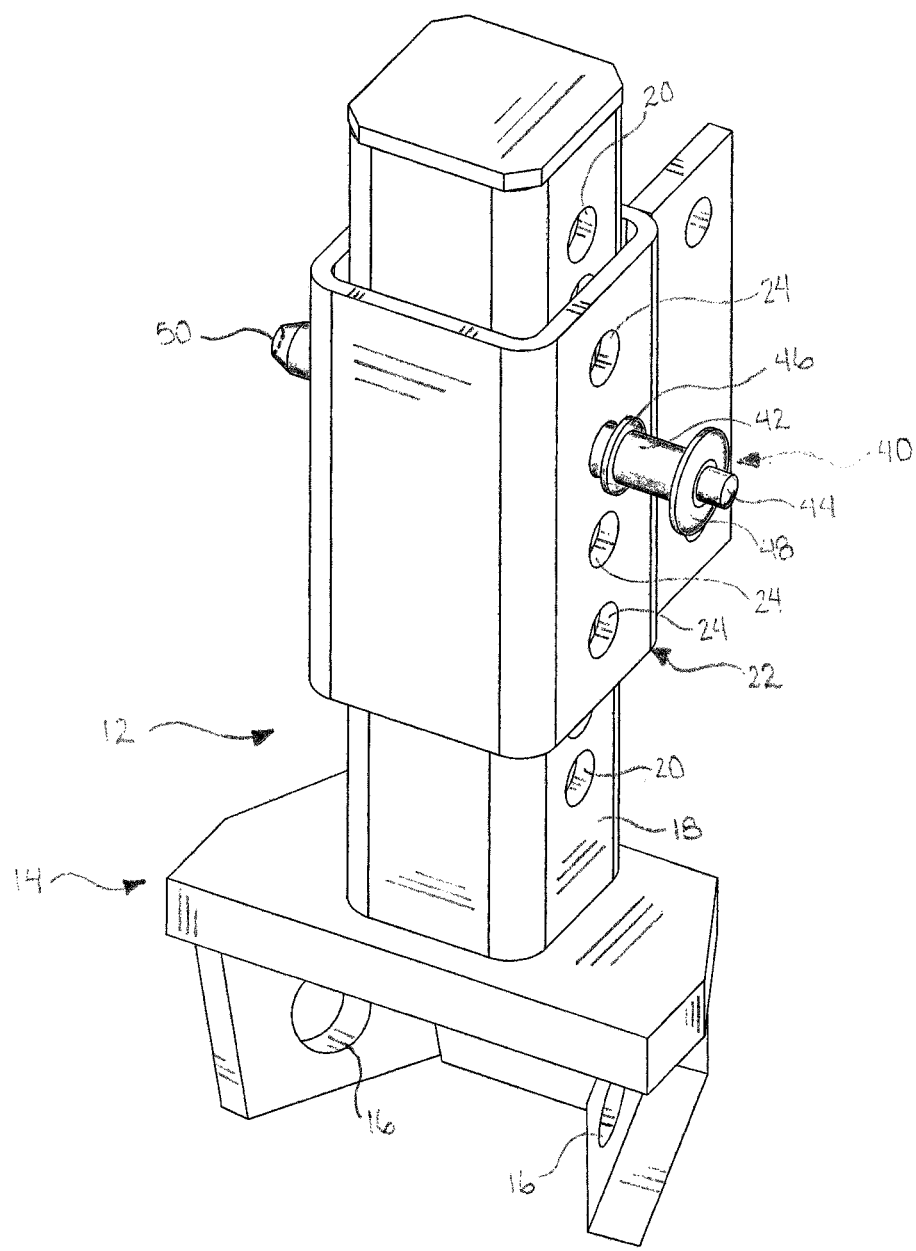
FIG. 2 is a top perspective view of an adjustable work-piece apparatus employing a prior art embodiment of a push-button locking pin.

Referring now to FIG. 2, a self-contained locking pin is indicated generally at 40, and is shown in the same agricultural machine 12 as illustrated in FIG. 1. The self-contained locking pin 40 differs from the conventional locking pin 10 depicted in FIG. 1, because, among other things, the locking elements are contained within the locking pin 40. In the illustrated embodiment, the body of the locking pin 42 is rigid, preferably metal, and houses a reciprocating spindle 44. Within the body are one or more locking elements (not shown) each of which is urged radially outward by the spindle 44 through complementary latch openings (not shown), cut into the body of the locking pin 42. Both the locking elements and latch openings will be described in further detail below. The body 42 also includes a retaining ring 46 and a gripping ring 48.

Similar to the conventional locking pin 10, after aligning the apertures, 24 and 20, the spindle 44 is depressed by the user and the tapered end 50 of the self-contained locking pin 40 is inserted through the corresponding apertures 24, 20 in both the fixed portion 22 and the movable portion 14 of the machine 12. Once the user releases the spindle 44, this insertion secures the position of the movable portion 14 in relation to the rest of the machine 12. However, the tubular, open tapered end 50 of the pin 40 enables entry of environmental contaminants into the body 42 of the pin. For example, when used in dusty or muddy conditions, dust can accumulate or mud can become caked in the open end 50, impeding movement of the spindle, and making the locking pin 40 difficult to extract from the machine 12. Also, the spindle 44 may be impeded by other contaminants.

Figure 3:
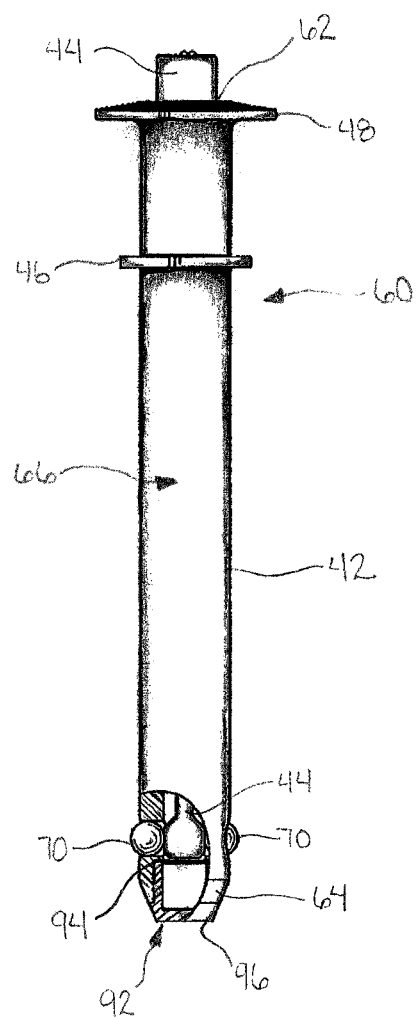
FIG. 3 is a fragmentary side elevation view of the present locking pin.
Figure 4:
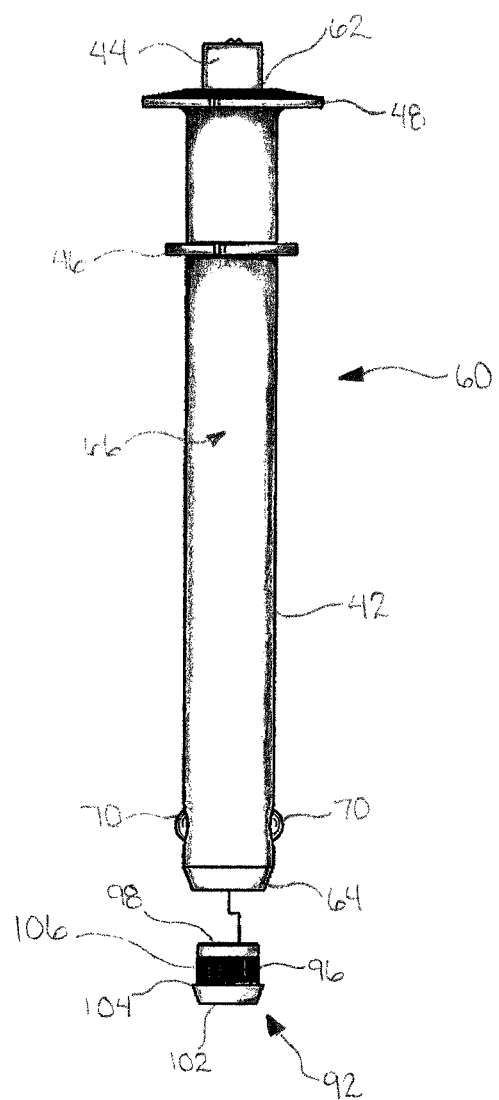
FIG. 4 is an exploded side elevation view of the present locking pin.
Figure 5:
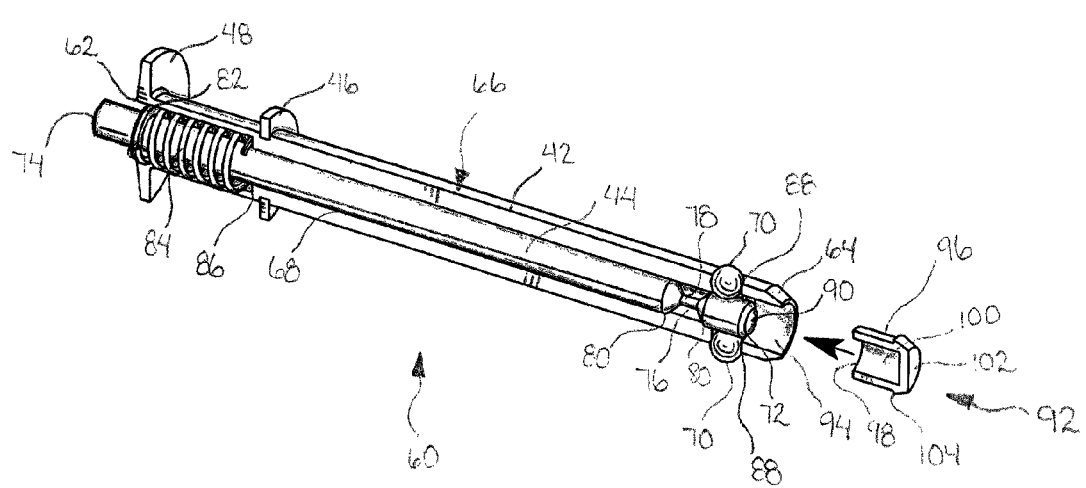
FIG. 5 is an exploded fragmentary perspective view of the present locking pin.

Referring to FIGS. 3, 4, and 5, a preferred embodiment of a locking pin is indicated generally at 60. Components that are shared with the locking pin 40 in FIG. 2 are designated with identical reference numbers. The locking pin 60 includes an elongated rigid tubular body 42, preferably metallic, which has an actuating end 62, and an opposite tapered working end 64. The surface of the body 42, indicated generally at 66, is preferably smooth to reduce friction upon insertion into mechanical work-pieces. To properly position the locking pin 60, and to prevent the locking pin from dislodging prematurely, the body 42 of the locking pin 60 optionally has at least one retaining ring 46 located a distance of approximately ⅕ the length of the body 42 from the actuating end 62. If provided, the retaining ring 46 preferably has a diameter greater than that of the body 42. Proximate to the edge of the actuating end 62 is the gripping ring 48 preferably having a diameter greater than that of the retaining ring 46, to provide gripping leverage for a user while inserting and removing the locking pin 60.

Referring specifically to FIG. 5, the tubular body 42 defines an axial passageway 68, which houses the spindle 44. To properly reciprocate within the passageway 68, the spindle 44 is rigid, and preferably metallic, however, other suitably durable materials are contemplated. The spindle 44 has a first end 72 associated with the tapered working end 64, and a second end 74 associated with the actuating end 62 of the locking pin 60. In the preferred embodiment, the spindle 44 has a recess 76 located proximate to the first end 72 of the spindle. The recess 76 is defined by a portion 78 having a reduced diameter and joining tapered ends 80 of the spindle 44. An annular spring flange 82, projecting radially from the spindle 44, is located proximate to the second end 74 of the spindle. To facilitate reciprocation of the spindle 44 within the passageway 68, a biasing element 84 is inserted into a counter-bore 86 in the tubular body 42. Preferably, the biasing element 84 is a coiled spring, however other types of springs are contemplated. Also, the counterbore extends from the actuating end 62, toward the working end 64. Preferably, the length of the counter-bore 86 is approximately ⅕ the length of the locking pin 60, however, other dimensions are contemplated depending on the application.

To secure the spindle 44 and the biasing element 84 within the passageway 68, the body of the pin 42 is preferably crimped, swaged, or otherwise deformed, above the annular spring flange 82, which also provides an upper seat for the biasing element within the counter-bore 86. The crimp prevents the spindle 44 and the biasing element 84 from escaping the locking pin 60.

In the preferred embodiment, the locking pin 60 employs one or more locking elements 70, each positioned within the axial passageway 68 at a corresponding latch opening 88. The dimension and shape of the latch opening 88 enables the corresponding locking element 70 to partially project past a periphery of the body 42 of the locking pin 60. In this manner, since the diameter of the pin 60 with the extended locking elements 70 is greater than the corresponding apertures 20, 24 (FIGS. 1 & 2) the one or more locking elements prevent the locking pin from dislodging prematurely. Preferably, the locking elements 70 are spherical; however, other shapes are contemplated.

To facilitate insertion and removal of the locking pin 60 from a mechanical apparatus, the spindle 44 reciprocates within the axial passageway 68 between released and locked positions. To insert the locking pin 60 into a mechanical work-piece, a user actuates the spindle 44 by axially depressing the first end 74 relative to the tubular body 42, and in so doing overcomes the biasing force exerted by the spring 84. The gripping ring 48 ergonomically facilitates this operation. In this position, the locking elements 70 move into the spindle recess 76 upon pressure exerted by the perimeters of the apertures 20, 24, allowing insertion or removal of the pin 60 from the brackets 14, 22 (FIGS. 1 & 2).

Similarly, when a user releases the spindle 44, the biasing element 84 pushes against the spring flange 82 and urges the spindle outward and back to a locked position. Simultaneously, a tip 90 of the spindle 44, having a greater diameter than the portion 78, urges each of the locking elements 70 laterally into a corresponding latch opening 88. FIGS. 3, 4, and 5 each depict the locking pin 60 in its locked position. An important feature of the locking pin 60 is that a user can remove it from the machine 12 using one hand, which is not possible with the prior pin 10.

Since movement of the locking elements 70 within the body 42 of the locking pin 60 is important to insertion and removal of the pin, it is important to restrict entry of environmental contaminants, such as dust, mud or debris into the passageway 68.

Figure 6:
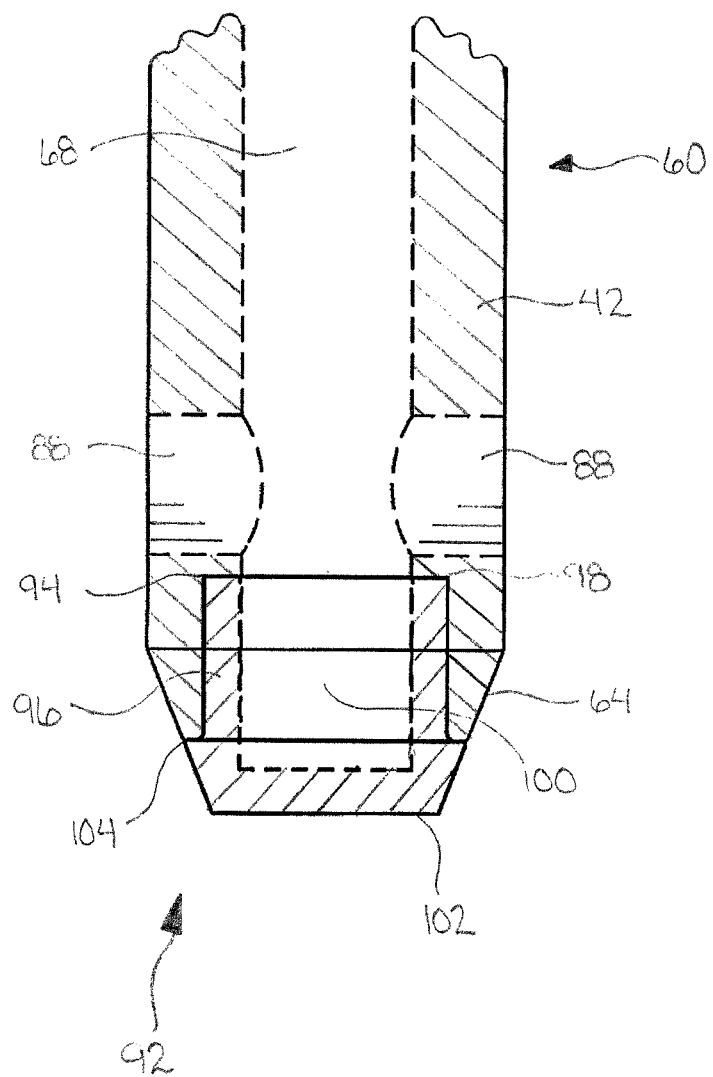
FIG. 6 is an enlarged fragmentary vertical cross-section of the present locking pin.

Referring now to FIGS. 3, 5, and 6, for this reason, the preferred embodiment of the locking pin 60 includes a protective cap, indicated generally at 92. The cap 92 is inserted into a counter-bore 94 located proximate to the working end 64 of the body of the locking pin 42. As shown on FIGS. 5 and 6, the cap 92 has a cap body 96 with an open end 98, which defines a tubular chamber 100 dimensioned to accommodate the tip 90 of the reciprocating spindle 44. Referring now to FIG. 6, it is important to note that once affixed to the tubular body 42, the cap 92 is dimensioned such that the chamber 100 maintains the diameter of the passageway 68. Thus, the spindle 44 freely reciprocates within the passageway 68 with the cap 92 installed.

The cap 92 also has a closed end 102, which has a tapered annular shoulder 104 that extends the taper of the working end 64 to facilitate insertion of the locking pin 60 into a mechanical work-piece. To enhance proper fit and seal within the counter-bore 94, the cap body 96 is dimensioned to engage the working end 64 of the body of the locking pin 42 with a tight friction fit. As illustrated in FIG. 4, this friction fit is obtained by knurling an exterior surface 106 of the open end 98 of the cap body 96. Other texturing procedures are contemplated. Additionally, the cap 92 is preferably held in position in the tubular body 42 by chemical adhesives, such as LOCTITE® adhesive or other equivalent products.

An important feature of the present locking pin 60 with the protective cap 92 is that it successfully addresses two specific design objectives: the first being facilitation of unhindered reciprocation of the spindle 44, and the second being retaining of the present protective cap within the working end 64 of the body of the locking pin while operating in severe work environments. The present locking pin 60 is configured for securing the present protective cap 92 in a way that successfully solves these design objectives. Even slight quantities of dust or other contaminants can impede movement of the spindle 44 and the one or more locking elements 70 within the passageway 68 of the present locking pin 60, making insertion and removal of the locking pin difficult for a user.

Consequently, the present protective cap 92 is friction fitted via the knurled surface 106 within the working end 64 of the body of the locking pin 60, and held in place with adhesive. Additionally, the spindle 44 maintains a close tolerance, sliding relationship in the tubular body 42 of the locking pin 60, which is maintained by the present protective cap 92 preserves this relationship via the dimensioning of the tubular chamber 100. The chamber 100 accommodates sliding relationship of the tip 90 of the spindle 44.

While a particular embodiment of the locking pin with protective cap has been described herein, it will be appreciated by those skilled in the art that changes and modifications may be made thereto without departing from the invention in its broader aspects and as set forth in the following claims.

The invention claimed is:

1. A locking pin for securing movable mechanical components, comprising:
    a tubular body defining an axial passageway, said body having an actuating end and a tapered working end opposite said actuating end, said body having at least one latch opening proximate said working end, said body having a cap counter-bore extending from said working end toward said actuating end;
    a spindle constructed and arranged for reciprocation in said axial passageway between a rest, locked position and an extended, release position, said spindle having a first end proximate said working end and a second end proximate said actuating end;
    at least one locking element, each positioned within said passageway at a corresponding latch opening, and being urged toward said corresponding latch opening by said spindle and partially extending through and out of said latch opening when said spindle is in said rest position; and
    a unitary cap fastened to said working end in said cap counter-bore, said cap having an open end defining a tubular chamber dimensioned for maintaining a diameter of said axial passageway and for accommodating said first end of said spindle upon depression of said second end of said spindle, said cap having a closed end opposite said open end, said cap being configured for restricting entry of contaminants into said passageway.

2. The pin as defined in claim 1, further including a biasing counter-bore extending from said actuating end toward said working end.

3. The pin as defined in claim 2, having a biasing element positioned in said passageway, extending the length of said biasing counter-bore.

4. The pin as defined in claim 3, wherein said passageway has an annular spring flange located proximate to said second end of said spindle for seating an actuation end of said biasing element.

5. The pin as defined in claim 1, wherein said body has at least one retaining ring having an outer peripheral edge with a greater diameter than an outer diameter of said body.

6. The pin as defined in claim 1, wherein said body has at least one gripping ring located proximate to said actuating end having an outer peripheral edge with a greater diameter than a retaining ring located on said body.

7. The pin as defined in claim 1, wherein said second end of said spindle is radially larger than said first end of said spindle.

8. The pin as defined in claim 7, wherein said spindle has a recess proximate to said first end defining an area of reduced diameter joining tapered ends of a narrowed shaft portion of said spindle.

9. The pin as defined in claim 8, wherein said spindle is configured for reciprocation in said passageway between said rest position, where said at least one locking element is urged laterally into said corresponding latch opening; and said release position, where said at least one locking element is released into said recess upon depression of said second end of said spindle.

10. The pin as defined in claim 1, wherein said unitary cap has a tapered annular shoulder extending said taper of said working end and facilitating location of said working end of said body into a work-piece.

11. A locking pin for securing movable mechanical components, comprising:
    a tubular body defining an axial passageway, said tubular body having an actuating end and a tapered working end opposite said actuating end, said tubular body having at least one latch opening proximate said working end;
    a spindle constructed and arranged for reciprocation in said axial passageway between a rest, locked position and an extended, release position, said spindle having a first end associated with said working end and a radially larger second end associated with said actuating end, and having a recess proximate to said first end defining an area of reduced diameter joining tapered ends of a narrowed shaft portion of said spindle;
    at least one locking element, each positioned within said passageway at a corresponding latch opening, and being urged toward said corresponding latch opening by said spindle and partially extending through and out of said latch opening when said spindle is in said rest position; and at least one annular retaining flange located on said tubular body and having an outer peripheral edge with a greater diameter than an outer diameter of said tubular body;

at least one annular gripping flange located proximate to said actuating end having an outer peripheral edge with a greater diameter than said retaining flange located on said tubular body;

a biasing counter-bore extending from said actuating end toward said working end;

a cap counter-bore extending from said working end toward said actuating end;

a biasing element positioned in said passageway, extending the length of said biasing counter-bore;

a unitary cap having an open end positioned within said cap counter-bore, defining a tubular chamber dimensioned for maintaining a diameter of said axial passageway and for accommodating said first end of said spindle upon depression of said second end of said spindle, and having a closed end opposite said open end;

a tapered annular shoulder extending said tapered working end of the locking pin, and facilitating location of said working end into a work-piece, said annular shoulder being positioned closer to said closed end than said open end, and being connected to a conical frustum;

said unitary cap being configured for engaging said working end of said tubular body with a friction fit for restricting entry of contaminants into the passageway, said friction fit being obtained by an exterior surface of said cap being knurled;

said exterior knurled surface remaining in continuous contact with an interior surface of said cap counter-bore regardless of the position of said spindle within said axial passageway;

said spindle being configured for reciprocation in said passageway between said rest position, when said at least one locking element is urged laterally into said corresponding latch opening; and said release position, when said at least one locking element is released into said recess upon depression of said second end of said spindle; and said tubular body having an annular spring flange located proximate to said second end of said spindle for seating an actuation end of said biasing element.

\* \* \* \* \*